United States Patent
Copsey (10) Patent No.: US 9,613,265 B2
(45) Date of Patent: Apr. 4, 2017

(54) METHOD AND DEVICE FOR CAPTURING A DOCUMENT

(71) Applicant: Open Text SA ULC, Halifax (CA)

(72) Inventor: Simon Dominic Copsey, Horsham (GB)

(73) Assignee: Open Text SA ULC, Halifax (CA)

( * ) Notice: Subject to any disclaimer, the term of this patent is extended or adjusted under 35 U.S.C. 154(b) by 67 days.

(21) Appl. No.: 14/675,243

(22) Filed: Mar. 31, 2015

(65) Prior Publication Data

US 2015/0278594 A1    Oct. 1, 2015

(30) Foreign Application Priority Data

Mar. 31, 2014   (EP) ..................................... 14162937

(51) Int. Cl.
| | |
|---|---|
| *G06K 9/00* | (2006.01) |
| *H04N 1/387* | (2006.01) |
| *G06K 9/22* | (2006.01) |
| *G06K 9/32* | (2006.01) |
| *G06K 9/36* | (2006.01) |

(52) U.S. Cl.
CPC ..... *G06K 9/00442* (2013.01); *G06K 9/00912* (2013.01); *G06K 9/22* (2013.01); *G06K 9/32* (2013.01); *H04N 1/3873* (2013.01); *G06K 2009/363* (2013.01)

(58) Field of Classification Search
CPC ........ G06K 9/00912; G06K 9/22; G06K 9/32; H04N 1/3873
See application file for complete search history.

(56) References Cited

U.S. PATENT DOCUMENTS

| | | | | |
|---|---|---|---|---|
| 2011/0280450 A1* | 11/2011 | Nepomniachtchi | ...... | G06K 9/32 382/112 |
| 2012/0288190 A1* | 11/2012 | Tang | ........................ | G06K 9/00 382/165 |
| 2013/0044194 A1* | 2/2013 | Tilt | ........................ | G06T 1/0007 348/61 |
| 2014/0086455 A1* | 3/2014 | Kotovich | ............... | G06K 9/036 382/112 |

(Continued)

*Primary Examiner* — Bhavesh Mehta
*Assistant Examiner* — Ian Lemieux
(74) *Attorney, Agent, or Firm* — Sprinkle IP Law Group (57) ABSTRACT

A method and device for capturing a positionally corrected image of a document is disclosed. The method comprises the steps of: obtaining a two-dimensional image of the document with a mobile terminal apparatus; performing edge detection within the two-dimensional image to identify edges of the document; determining angles between detected edges; calculating, based on the detected edges and the angles determined, a three-dimensional position of the document relative to a position of the mobile terminal apparatus; calculating correction information to correct, by relative movement, the position of the document relative to the position of the mobile terminal apparatus; providing first guidance information derived from the correction information to a user of the mobile terminal apparatus, guiding the user to perform the relative movement; and capturing a positionally corrected image of the document. Thereby, the document can be captured with a quality sufficient to permit Optical Character Recognition (OCR).

21 Claims, 3 Drawing Sheets

(56) References Cited

U.S. PATENT DOCUMENTS

| | | | |
|---|---|---|---|
| 2015/0146020 A1* | 5/2015 | Imaizumi | G06K 9/22 348/207.1 |
| 2015/0220800 A1* | 8/2015 | Mahli | G06K 9/036 382/112 |
| 2016/0259974 A1* | 9/2016 | Macciola | G06K 9/00463 |
| 2016/0284123 A1* | 9/2016 | Hare | G06T 17/20 |

* cited by examiner

METHOD AND DEVICE FOR CAPTURING A DOCUMENT

CROSS REFERENCE TO RELATED APPLICATION(S)

This application claims a benefit of priority under 35 U.S.C. §119(a) from European Patent Application Serial No. 14162937.8, filed Mar. 31, 2014, entitled "A METHOD AND DEVICE FOR CAPTURING A DOCUMENT," which is fully incorporated by reference herein for all purposes.

TECHNICAL FIELD

The invention relates generally to capturing a document. More particularly, this disclosure relates to a method and device, useful in or with a mobile terminal apparatus, for capturing a document. Even more specifically, this disclosure relates to a method or apparatus for scanning a document with improved image quality for Optical Character Recognition (OCR).

BACKGROUND OF RELATED ART

In an electronic world, there is a demand to have documents in electronic form and thus, easy to handle electronically. Consequently, documents in paper form need to be captured, processed and stored in electronic form. This needs to be done anytime and anywhere. To reduce the time and effort for processing the information of such documents, OCR is performed to convert the information into machine-encoded/computer-readable text; however, to achieve good results and more specifically, to reduce the number of false detections, documents in electronic form need to be of sufficient image quality to permit successful OCR processing.

SUMMARY

In order to achieve the above goals, mobile terminal apparatuses having a device for capturing or scanning a document with sufficient quality to permit OCR can be used. Specifically, such devices may use position sensors to measure the position of the device and provide information to a user as to how to change the position of the device with respect to the document such that it becomes horizontal. That is, capturing a document with such a device requires the document to have a substantially horizontal position. In response to the information generated and corresponding with the measured position/orientation of the device, the user then changes the position/orientation thereof such that the device is substantially horizontal as well, and thus parallel to the document. However, always positioning the document parallel to the device burdens the user because, in particular cases where no horizontal reference plane (e.g., a table, desk, or the like) is present, the user needs to hold the document with one hand, while at the same time holding the device parallel to the orientation of the document with the other hand as well. Additionally, position sensors consume energy, which (especially in the case of mobile terminal apparatuses) reduces their usability due to the fact that the battery capacity of such apparatuses usually is limited.

Therefore, there is a need in the art to address problems associated with devices for capturing a document with an image quality sufficient to permit OCR.

According to a representative aspect of the invention, a method for capturing a document by a mobile terminal apparatus comprises the steps of obtaining a two-dimensional image of the document, performing edge detection within the two-dimensional image to identify edges of the document, determining/detecting angles between detected edges, calculating (e.g., based on the detected edges and the angles determined) a three-dimensional position of the document relative to a position of the mobile terminal apparatus, calculating correction information to correct (e.g., by relative movement) the position of the document relative to the position of the mobile terminal apparatus, providing first guidance information derived from the correction information to a user of the mobile terminal apparatus, guiding the user to perform the relative movement, and capturing the document.

According to representative embodiments of this disclosure, a document can be captured with an optimized or otherwise improved image quality for OCR. In particular, distortions due to misalignment as between the document to be captured and the mobile terminal device may be avoided or otherwise reduced.

In one example, the step of determining/detecting angles between edges may include, for each two detected edges, a determination as to whether the edges have an intersection, and if the edges have an intersection, a determination of an angle between the two edges. In this way, the entire document can be captured.

In another example, the method may further include calculating (e.g., based on correction information) an amount of relative movement to be performed to correct the position of the document relative to the position of the mobile terminal apparatus, and providing second guidance information according to the amount of relative movement to the user of the mobile terminal apparatus, guiding the user to perform the relative movement. At least because the relative movement can be performed in accordance with the second guidance information in one step, the document may be captured more quickly, further improving the performance of the invention.

In yet another representative example, the step of capturing may be performed automatically if the amount of relative movement is equal to or lower than a predetermined movement threshold. Automated capturing can eliminate the need to use a triggering key (i.e., a key that may otherwise be required to trigger capture of the document). As using a triggering key may cause unintentional movement of the mobile apparatus, elimination of such a need may operate to avoid unintentional movement and provide further improvement on the image quality of a document thus captured.

In another representative example, the step of capturing may further include the steps of determining an image quality value of a document before capturing, performing image enhancement operations if the quality value is equal to or lower than a predetermined quality threshold, and/or performing OCR of the captured document. Accordingly, the quality of the document may be further improved.

According to another representative aspect, a device (e.g., a mobile terminal apparatus) for capturing a document comprises means for obtaining a two-dimensional image of the document, means for performing edge detection within the two-dimensional image to identify edges of the document, means for determining/detecting angles between detected edges, means for calculating (based on the detected edges and the angles determined) a three-dimensional position of the document relative to a position of the mobile terminal apparatus, means for calculating correction information to correct (by relative movement) the position of the document relative to the position of the mobile terminal apparatus, means for providing guidance information derived from the correction information to a user of the mobile terminal apparatus (guiding the user to perform the relative movement), and means for capturing the document.

In another representative example, the means for edge detection may be adapted to further determine whether the edges have an intersection, and if the edges have an intersection, to further determine/detect an angle between two edges.

In another representative example, the device further comprises means for calculating (e.g., based on the correction information) an amount of relative movement to be performed to correct the position of the document relative to the position of the mobile terminal apparatus, and means for providing second guidance information (e.g., according to the amount of relative movement) to the user of the mobile terminal apparatus, guiding the user to perform the relative corrective movement.

In yet another representative example, the means for capturing is further adapted to automatically capture the document if the amount of relative movement is equal to or lower than a predetermined movement threshold.

In one representative example, the device further comprises one or more means for determining an image quality value of the document, means for performing enhancement operations if the quality value is equal to or lower than a predetermined quality threshold, and means for performing OCR of the captured document.

In each of the above aspects and examples, the first and second guidance information may include visual, audible, tactile, or combinations thereof.

In further representative aspects, the invention may include a mobile terminal apparatus having a device for scanning a document, a computer program product comprising machine-executable instructions, which (when executed by a processing device) perform the steps of the method for scanning a document, and at least one non-transitory machine-readable medium having embodied thereon a computer program product.

BRIEF DESCRIPTION OF THE DRAWINGS

The drawings accompanying and forming part of this specification are included to illustrate certain representative aspects of the invention. A clearer impression of the invention, and of the components and operation of systems provided with the invention, will become more readily apparent by referring to the exemplary, and therefore non-limiting, embodiments shown in the drawings, wherein identical reference numerals designate the same components. Note that the features illustrated in the drawings are not necessarily drawn to scale.

DETAILED DESCRIPTION

The invention and various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable and/or machine-executable instructions that may reside on a computer-readable and/or a machine-readable medium, for example, a hard disk (HD), hardware circuitry or the like, or any combination thereof.

The invention generally pertains to methods and devices for capturing a document by a mobile terminal apparatus. In particular, this disclosure pertains to a method and device for capturing a document with an image quality suitably adapted for improved OCR processing.

OCR is known in the art as being the mechanical or electronic conversion of scanned or photographed images of typewritten or printed text into machine-encoded/computer-readable text. OCR is used as a form of data entry from original paper data source material or documents. Thus, OCR is a common method of digitizing printed texts so that they can be electronically edited, searched, stored more compactly, displayed on-line, and used in machine processes such as machine translation, text-to-speech, key data extraction and text mining.

Now, non-limiting embodiments of the invention are explained in more detail with reference to the accompanying drawings.

Figure 1:
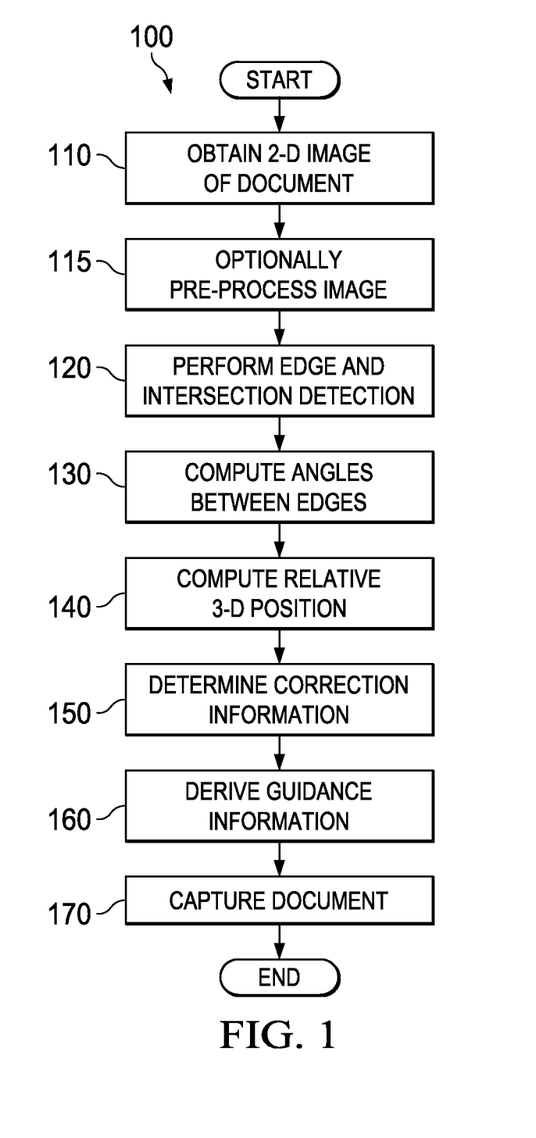
FIG. 1 shows a flow chart/diagram illustrating a method for capturing a document, in accordance with an embodiment of the invention.

FIG. 1 shows a flow chart/diagram illustrating a method for capturing a document, in accordance with one embodiment of the invention. The method may be performed by a mobile terminal apparatus such as a laptop, a personal data assistant (PDA), tablet computer, mobile telephone, and/or the like.

Representative documents to be captured by the method disclosed hereinafter can include paper documents, such as invoices, bank statements, receipts, business cards, mail, or any number of printed records. It will be appreciated by those skilled in the art that documents may also comprise a display of information on a display device, such as a display screen of a laptop, tablet computer, electronic paper, e-paper, electronic ink, smart phone, mobile telephone, or any other mode of presentation which can be captured by, for example, an optical device, such as a camera of a mobile terminal apparatus.

In FIG. 1, representative method 100 starts at block 110. In block 110, a two-dimensional image of a document is obtained. For example, the two-dimensional image of the document may be obtained using an optical device such as a camera. The optical camera can be stand-alone with a connection to the mobile terminal apparatus, or may be incorporated in the mobile terminal apparatus. The two-dimensional image may have a particular resolution, color depth, and brightness. The two-dimensional image may be displayed on a display device of the mobile terminal apparatus, and thus viewed by a user of the mobile terminal apparatus.

Optionally, pre-processing may be performed in block 115 to improve the quality of the two-dimensional image obtained in block 110. Pre-processing may include smoothing (e.g., Gaussian smoothing), noise reduction, and/or the like. For example, it may be determined that the exposure of the two-dimensional image is insufficient (e.g., too dark, too bright, shadowed, etc.) and/or the image definition/focus is insufficient. If insufficiency is observed (i.e., exceeding a predetermined threshold), corresponding guidance information to guide the user in performing an action to improve quality of the two-dimensional image is generated and provided. Examples of such guidance information may include reducing/increasing the exposure, switching on/off a flashlight or lamp of the mobile terminal apparatus, and/or moving the mobile terminal apparatus closer/farther away from the document. Guidance information is provided to the user of the mobile terminal apparatus. For example, guidance information can be displayed on the display device. The method then starts again in block 110.

Then, in block 120, an edge detection process is performed on the two-dimensional image to identify edges of the document contained in the two-dimensional image.

As it is known to those skilled in the art, edge detection relates to a mathematical method for identifying points at which the brightness changes sharply or has discontinuities. In general, methods for edge detection comprise search-based methods detecting edges by first computing a measure of edge strength (e.g., a first-order derivative expression, such as the gradient magnitude) and then searching for local directional maxima of the gradient magnitude using a computed estimate of the local orientation of the edge (e.g., the first-order gradient direction, or the second-order inflection points in the second-derivative expression computed from the two-dimensional image) in order to find edges; for example, the zero-crossings of the Laplacian or the inflection points of a non-linear differential expression. Such methods for edge detection are known to those skilled in the art, and accordingly, a detailed explanation with respect to their application has been omitted for brevity.

Edge detection may be performed according to representative embodiments of the invention by scanning the two-dimensional image obtained in block 110 horizontally, line-by-line, and/or vertically, column-by-column, in order to detect an abrupt transition in the color from, for example, black to white, or in the color luminance from dark to light, and vice versa. Abrupt transitions detected horizontally/vertically can then be combined to form horizontal/vertical edges. In a representative embodiment, colored lines corresponding to the detected edges are displayed on the display device of the mobile terminal device to visualize the detected edges and guide the user.

In block 120, preferably four edges of the document are detected in the two-dimensional image by engaging an edge detection process. If less than four edges are detected, corresponding guidance information may be generated and provided to the user of the mobile terminal apparatus, to guide the user to obtain the two-dimensional image such that all four edges of the document can be detected. For example, this guidance information can be displayed on the display device of the mobile terminal apparatus guiding the user to move the position of the mobile terminal apparatus, or the optical sensor device (in the case that the optical device and the mobile terminal are separate devices and movably coupled), in a direction that all four edges of the document may be displayed on the display device.

Additionally, it can be determined in block 120 whether two adjacent detected edges have an intersection with one another within, or outside, the two-dimensional image. If two adjacent edges have an intersection, the angle between the two adjacent edges can be determined/detected. If there is no intersection observed, the two adjacent edges may be elongated until they have an intersection with one another within, or outside, the two-dimensional image. Otherwise, if it is determined that two adjacent edges have no intersection within the two-dimensional image, corresponding guidance information can be generated. Corrective guidance information is provided to the user of the mobile terminal apparatus to guide the user to obtain an improved two-dimensional image of the entire document. For example, the guidance information can be displayed on the display device of the mobile terminal apparatus. Examples of representative guidance information include changed color of lines with which the detected edges are highlighted, for example, in a specific color. The method then starts again with block 110.

Optionally, the planarity of the two-dimensional image can be analyzed to determine whether the document from which the two-dimensional image is obtained is sufficiently flat. In a representative example, as the background of the document usually has a uniform color, the region between the detected edges can be analyzed with respect to whether its color is uniform or not. In another example, it can be determined whether each of the detected edges in block 120 is a straight line. In case of non-uniformity or an edge not conforming to a straight line, corresponding guidance information is generated. The guidance information is provided to the user of the mobile terminal apparatus to prompt and guide the user to flatten the document. For example, the guidance information can be displayed on the display device of the mobile terminal apparatus. The method then starts again with block 110.

In block 130, angles between the detected edges in block 120 can be determined/detected. The detected edges in block 120 are considered as constituting rays sharing a common endpoint, namely the intersection of the edges. For each of the edges, an angle in the plane of the two-dimensional image can be determined or otherwise observed. Methods for determining an angle formed by two rays are known to those skilled in the art. Detailed description with respect to the same has therefore been omitted for brevity.

The method then turns to block 140 in which a three-dimensional position of the document relative to a position of the mobile terminal apparatus is calculated based on the detected edges in block 120 and the angles determined/detected in block 130. The three-dimensional position of the document corresponds to a document plane, and the plane of the two-dimensional image corresponds to a reference plane parallel to the sensor plane of the optical device component of the mobile terminal apparatus. Furthermore, it can be assumed that the shape of the document corresponds to that of a substantially orthogonal rectangle where adjacent edges of the document are generally perpendicular to one another. Representative processing in block 140 may include projection and/or keystone correction.

According to another representative example, processing in block 140 may be performed as follows: as described above, it can be assumed that the document from which the two-dimensional image is obtained has a rectangular shape, and that the reference plane corresponds to the plane of the two-dimensional image with reference to which the plane of the document may be calculated. Furthermore, the detected edges in block 120 and the angles determined/detected in block 130 are taken as input for processing. The processing, in principle, may be performed in two steps; namely a step for calculating the right-to-left tilt of the plane of the document with respect to the reference plane, and a step for calculating the top-to-bottom tilt of the document with respect to the reference plane. As will be appreciated by one skilled in the art, the order of the aforementioned steps is not necessarily important. Furthermore, the steps may be either performed sequentially or in parallel.

For the right-to-left tilt, it can be determined whether the left edge or the right edge is longer in length in the two-dimensional image. The longer edge is regarded as being more close to the optical device component of the mobile terminal apparatus. Alternatively, the same result may be achieved by comparing the angles, wherein the edge having acute angles with adjacent edges can be regarded as being more close to the optical device component than the edge having obtuse angles between its adjacent edges. The plane of the two-dimensional image then can be turned in three-dimensional space around an axis lying in the same plane and being parallel to either the left or the right edge. For example, the axis for turning the image may correspond to the right or left edge. Alternatively, conjunctively or concurrently, the plane of the two-dimensional image may be turned until the angles between the adjacent edges become substantially perpendicular, and/or until the left and right edges become substantially equal in length. As a result of turning the plane of the two-dimensional image, a transformation matrix for mapping the reference plane to the plane of the document within one plane can be generated.

For the top-to-bottom tilt, the above steps can be performed similarly with respect to the top edge and the bottom edge, thereby resulting in a transformation matrix for mapping the reference plane to the plane of the document in another plane.

The plane of the document in three-dimensional space can then be calculated using the transformation matrices and the reference plane.

Then, in block 150, correction information can be calculated to correct the position of the document relative to the position of the mobile terminal apparatus. Specifically, the correction information may correspond to a relative movement with respect to the sensor plane, or the document, such that the positions of the document and the sensor plane become substantially parallel. For example, the angles between the plane of the document corresponding to the three-dimensional position thereof, and the reference plane can be calculated (e.g., using normal vectors of the planes, as will be appreciated by skilled artisans) and the correction information can be derived from the angles between the planes. The correction information corresponds to directions for relative movement, and if the relative movement is performed in the indicated directions, the angles between the planes will be reduced until they become coincident (e.g., substantially equal to zero), thereby reducing the tilt of the plane of the document with respect to the reference plane.

In one example, an amount of relative movement to be performed to correct the position of the document relative to the position of the mobile terminal apparatus can be calculated based on the correction information. In a representative embodiment, the angle between the planes may be used as information indicating the amount of the relative movement.

In block 160, guidance information can be derived from the correction information. The guidance information may be provided to the user in order to prompt and guide the user to perform the relative movement. For example, the guidance information can be displayed on the display device of the mobile terminal apparatus as first guidance information. Examples of first guidance information are discussed in more detail below.

Where the amount of the relative movement is calculated as well, the first guidance information includes additional information, or additional guidance information may be derived, indicating the amount of the relative movement and guiding the user to perform the relative movement corresponding to the amount required for correction. The additional guidance information can be provided to the user (e.g., by being displayed on the display device of the mobile terminal apparatus) as second guidance information.

In accordance with at least the first guidance information, the user then changes the position of either the document, or the mobile terminal apparatus. That is to say, the user changes the position of the document to be captured or the optical device component of the mobile terminal apparatus by performing relative movement in the direction as indicated by the first guidance information. Additionally, the user performs relative movement with an amount as indicated by the second guidance information. When performing relative movement, a remaining amount of relative movement to be performed can be calculated based on the amount of relative movement performed. If the amount of relative movement as indicated by the second guidance information is performed, the user can be informed accordingly.

In a representative example, blocks 110 to 160 may be performed repeatedly. To be more specific, if the position of the mobile terminal apparatus, or the position of the document, is changed by performing relative movement in accordance with the first and/or second guidance information provided to a particular extent, the method returns to, or starts again at, block 110. Specifically, when relative movement is performed, at least the amount of relative movement as indicated by the second guidance information can be compared with a predetermined threshold value. If the amount is lower than or equal to the threshold value, the method turns to block 170; otherwise, blocks 110 to 160 are repeated.

In block 170, the document is captured. This may include taking an image of the document using, for example, an optical device, such as a camera or another optical sensor of, or connected to the mobile terminal apparatus. The image can then be processed by the mobile terminal apparatus, stored in a memory of the mobile terminal apparatus, and/or transmitted to an external device for further processing, or an external storage, via a communication link. Processing of the image at the external device may include, for example, OCR processing.

In another representative example, the document may be captured in block 170 automatically if the amount of relative movement to be performed by the user is equal to or lower than a predetermined movement threshold. More specifically, if the amount of relative movement is equal to or lower than a predetermined movement threshold, capturing can be performed automatically. For example, a document may be automatically captured if an amount of relative rotation/translation/camber movement is equal to or lower than a predetermined movement threshold, and thus the image quality of the document when captured is equal to or higher than a predetermined quality threshold. In certain preferred exemplary embodiments, if the amount of relative movement is equal to or lower than a predetermined movement threshold for a particular time period, capturing can be performed automatically. A particular time period for automatic capture can be predetermined or pre-configured by the user. For example, a document may be automatically captured if an amount of relative rotation/translation/camber movement is equal to or lower than a predetermined movement threshold for a default or user-configured amount of time (e.g., a few seconds, a second, or a fraction thereof).

Additionally, the operation of capturing in block 170 may comprise a determination of image quality value of the document before it is captured, performance of image enhancement operations (e.g., if the quality value is equal to or lower than a predetermined quality threshold), and/or performance of OCR of the captured document. Enhancement operations may be similar to those described above with respect to pre-processing. For example, enhancement operations may comprise, for example, contrast adjustment, brightness adjustment, white balance, and/or the like.

The guidance information may include any of visual, audible, tactile, or combinations thereof. For example, the first guidance information indicating a direction may be displayed on the display device of the mobile terminal apparatus using icons, arrows, and/or the like, and/or output audible sounds using a speaker device component of the mobile terminal apparatus. In a representative embodiment, the second guidance information may be preferably displayed on a display device using a bar graph or scale. Other representations of the second guidance information may also be possible. Alternatively, conjunctively or concurrently, tactile vibrations can be generated using vibration device components of the mobile terminal apparatus to provide guidance information to the user of the mobile terminal apparatus.

Figure 2:
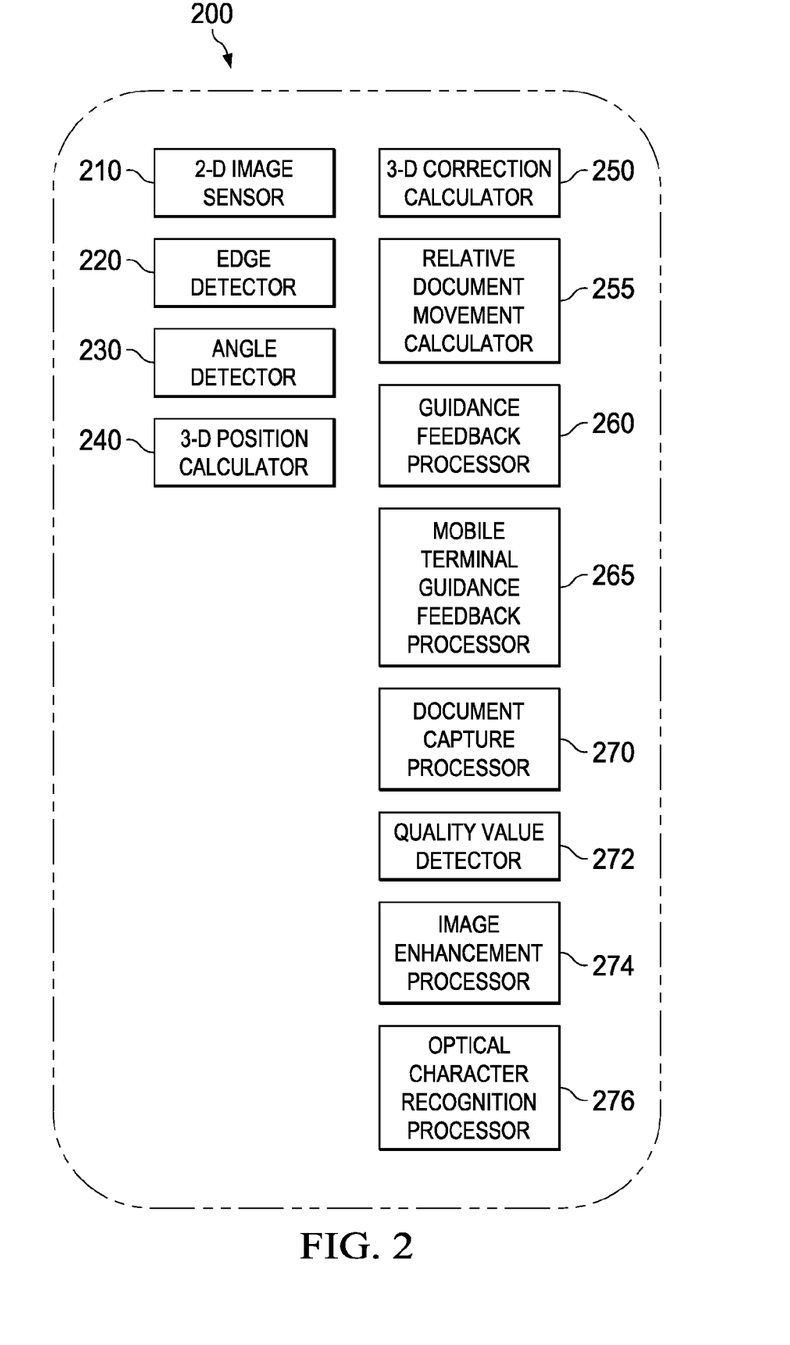
FIG. 2 is a block diagram of a device, useful in a mobile terminal apparatus for capturing a document in accordance with an embodiment of the invention.

FIG. 2 is a block diagram of representative device components useful in/with a mobile terminal apparatus for capturing a document in accordance with a representative embodiment of the invention.

In principle, device 200 may be suitably adapted to perform functions corresponding to steps of a method as generally described above with reference to FIG. 1.

For example, device 200 may comprise: sensor means 210 adapted to obtain a two-dimensional image of the document; detection means 220 adapted to perform edge detection within the two-dimensional image to identify edges of the document; detection means 230 adapted to determine angles between detected edges; calculation means 240 adapted to calculate (e.g., based on the detected edges and the angles determined) a three-dimensional position of the document relative to a position of the mobile terminal apparatus; calculation means 250 adapted to calculate correction information to correct (e.g., by relative movement) the position of the document relative to the position of the mobile terminal apparatus; feedback means 260 adapted to provide guidance information derived from correction information to a user of the mobile terminal apparatus, guiding the user to perform the relative corrective movement; and processing means 270 adapted to capture the document.

Representatively, sensor means 210 may comprise an optical device (such as a camera); means 220 to 250 may correspond to one or more processors. Feedback means 260 may be configured as any of a display device, a sound device, and/or a vibration device.

Detection means 230 may be further adapted to, for each two edges detected, determine whether the edges have an intersection, and if the edges have an intersection, determine/detect an angle between the two edges.

Device 200 may further comprise calculation means 255 adapted to calculate (e.g., based on correction information) an amount or magnitude of relative movement to be performed to at least partially correct the position of the document relative to the position of the mobile terminal apparatus, and feedback means 265 adapted to provide second guidance information for the amount of relative movement to the user of the mobile terminal apparatus, thereby prompting/guiding the user to perform the relative corrective movement. Feedback means 265 may comprise any of a display device, a sound device, and/or a vibration device. Feedback means 265 can be combined together with feedback means 260 in representative embodiments.

Processing means 270 may be further adapted or otherwise configured to automatically capture the document if the amount of relative movement is equal to or lower than a predetermined movement threshold.

Device 200 may further comprise one or more of detection means 272 adapted to determine an image quality value of the document, processing means 274 adapted to perform image enhancement operations if the quality value is equal to or lower than a predetermined quality threshold, and/or processing means 276 adapted to perform OCR of the captured document.

In one example, feedback means 260 may comprise or otherwise communicate with a vibration device where the corrective user guidance information is tactile. In a representative embodiment, the vibration device may comprise four vibration units, one at each side of device 200. Vibration units may be controlled separately. The vibration unit at the side of device 200, in correspondence to supplied positioning guidance information, may be activated to guide the user to move device 200 in the direction corresponding to the side of device 200 that vibrates. Additionally, activation of the vibration device(s) may be controlled such that a force is generated urging the device in the direction corresponding to guidance information.

In certain representative embodiments, device 200 may comprise an electronic or computing device. Device 200, in a preferred representative embodiment, may be embedded or otherwise included in/with a mobile terminal apparatus such as a laptop, PDA, tablet computer, mobile telephone, and/or the like.

Other representative examples of the invention provide a mobile terminal apparatus comprising the device substantially depicted in FIG. 2, a computer program product comprising machine-executable instructions which when executed by a processing device perform the steps of the method substantially depicted in FIG. 1, and a non-transitory computer readable medium having embodied thereon a computer program product.

Figure 3A:
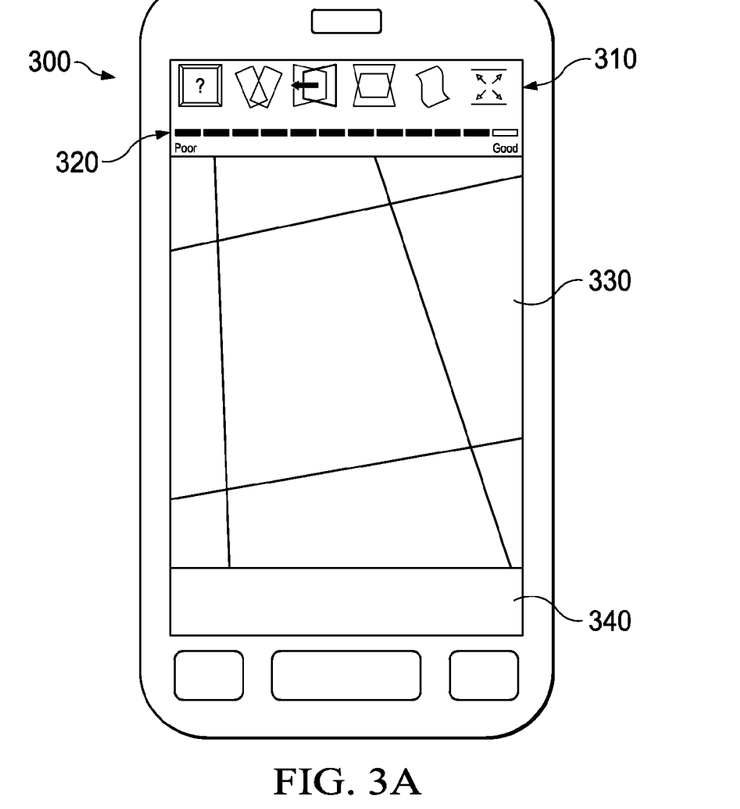
FIG. 3A is an illustration of a mobile terminal apparatus, including a device for capturing a document, in accordance with an embodiment of the invention.
Figure 3B:
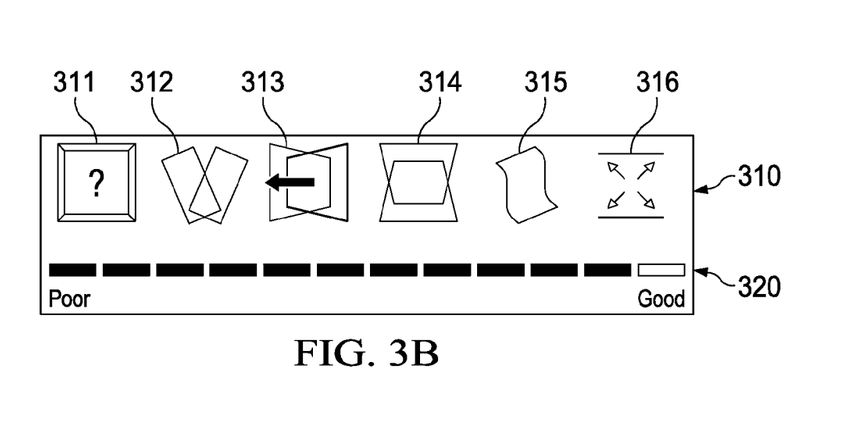
FIG. 3B is an illustration of part of a mobile terminal apparatus interface showing guidance information in accordance with an embodiment of the invention.

FIG. 3A is an illustration of a mobile terminal apparatus including a device for capturing a document, in accordance with a representative embodiment of the invention. FIG. 3B is an illustration of part of a mobile terminal apparatus interface showing guidance information in accordance with a representative embodiment of the invention.

As shown in the corresponding illustration, a mobile terminal apparatus 300 (e.g., smart phone) includes a device for capturing a document. Smart phone 300 has a display device divided into a section for displaying first guidance information 310, a section for displaying second guidance information 320, a section for displaying the two-dimensional image 330 obtained from a document, and a section to toggle whether the document will be captured automatically 340.

In FIG. 3B, enlargements of sections 310 and 320 are further depicted. Section 310 contains icons corresponding to first guidance information. The following representative icons are shown, from left to right: at least one of the edges was not detected 311, rotate the mobile terminal apparatus left/right 312, move the mobile terminal apparatus left/right 313, move the mobile terminal apparatus up/down 314, planarity of the document is insufficiently flat 315, and move the mobile terminal closer to or farther away from the document 316. Section 320 may comprise a bar graph corresponding to second guidance information, and either shows the amount of relative rotation/translation/camber movement in accordance with the icon of section 310 or an image quality value of the captured document. The document may be automatically captured if the amount shown in section 320 is equal to or lower than a predetermined movement threshold, and thus the image quality of the document when captured is equal to or higher than a predetermined quality threshold.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments and examples of the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular representative embodiments thereof, a latitude of modification, various changes and substitutions are intended in the foregoing disclosure, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

As used herein, the terms "determining," "determination," "detecting," "detection," "detector," and/or the like, refer to functions and/or device components that assign or otherwise provide an output value for at least one of a direct measurement, an in-direct measurement, and/or a computed measurement. For example, a determination or detection of an angle between two lines may comprise a direct measurement of the angle between the lines, an in-direct measurement of the angle (e.g., as in the case of extending the length of two non-parallel lines outside the area of observation so as to predict their angle of intersection), and/or a computed measurement (e.g., using trigonometric functions to calculate the angle). Accordingly, "determining" the angle of intersection may be regarded as equivalent to "detecting" the angle of intersection, and a "detector" for determining the angle may be regarded as directly measuring, indirectly measuring, and/or computing the angle between the lines.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments, which may or may not be given therewith or elsewhere in the specification, and all such embodiments are intended to be included within the scope of that term or terms. Language designating such non-limiting examples and illustrations includes, but is not limited to: "for example," "for instance," "e.g.," "in one embodiment."

Representative embodiments of this disclosure may be implemented in a computer communicatively coupled to a network, for example: the Internet, an intranet, an internet, a wide area network (WAN), a local area network (LAN), a storage area network (SAN), a personal area network (PAN), another computer, a standalone computer, and/or the like. As is known to those skilled in the art, the computer can include a central processing unit ("CPU") or processor, at least one read-only memory ("ROM"), at least one random access memory ("RAM"), at least one hard disc drive ("HDD"), and one or more input/output ("I/O") device(s). The I/O devices can include a keyboard, monitor, printer, electronic pointing device (e.g., mouse, trackball, stylus, etc.), or the like. In various embodiments of the invention, the computer has access to at least one database over the network.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium, whether now known or hereafter described in the art, which can be read by a processor. For example, a computer-readable medium may refer to a data cartridge, a data backup magnetic tape, a floppy diskette, a flash memory drive, an optical data storage drive, a compact disk read only memory ("CD-ROM"), ROM, RAM, HDD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device ("DASD") array, magnetic tape, floppy diskette, optical storage device, or other appropriate computer-readable medium or storage device.

In one exemplary embodiment of the invention, the computer-executable instructions may be lines of C++, Java, JavaScript, hypertext markup language ("HTML"), or any other programming or scripting code. Other software/hardware/network architectures may be used. For example, the functions of the invention may be implemented on one computer or shared among two or more computers. In one embodiment, the functions of the invention may be distributed in a network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a service is one or more computer processes, computing devices or both, configured to perform one or more functions. A service may present one or more interfaces that can be utilized to access these functions. Such interfaces include application programming interfaces (APIs), interfaces presented for a web services, remote procedure calls, remote method invocation, etc.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatuses, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language(s) can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement, in software, programming or other steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using: application specific integrated circuits (ASICs); programmable logic devices; field programmable gate arrays (FPGAs); and/or optical, chemical, biological, quantum or nano-engineered systems, components and mechanisms. In general, the functions of the invention can be achieved by any means now known or hereafter derived in the art. For example, distributed, or networked systems, components and circuits can be used. In another example, communication or transfer (or otherwise moving from one place to another) of data may be wired, wireless, or accomplished by any other means.

A "computer-readable medium" may be any medium that can contain, store, communicate, propagate, or transport the program for use by or in connection with the instruction execution system, apparatus, system or device. The computer readable medium can be, but not limited to, an electronic, magnetic, optical, electromagnetic, infrared, or semiconductor system, apparatus, system, device, propagation medium, or computer memory. Such computer-readable medium will generally be machine readable and include software programming or code that can be human readable (e.g., source code) or machine readable (e.g., object code).

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations by different (or the same) processing systems.

It will also be appreciated that one or more of the elements depicted in the drawings/figures can also be implemented in a more separated or integrated manner, or even removed or rendered as inoperable in certain cases, as may be useful in accordance with a particular application. Additionally, any signal arrows in the drawings/figures should be considered only as exemplary, and not limiting, unless otherwise specifically noted.

Furthermore, as used herein, a term preceded by "a" or "an" (and "the" when antecedent basis is "a" or "an") includes both the singular and plural of such term. Also, as used in the description herein, the meaning of "in" includes "in" and "on" unless the context clearly indicates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component. The scope of the present disclosure should be determined by the following claims and their legal equivalents.

What is claimed is:

1. A method for capturing a document by a mobile terminal apparatus, said method comprising:
    obtaining, by a document capturing device embodied on the mobile terminal apparatus, a two-dimensional image of the document;
    the document capturing device performing edge detection within the two-dimensional image to identify edges of the document;
    the document capturing device determining angles between detected edges;
    the document capturing device calculating, based on the detected edges and the angles determined, a three-dimensional position of the document relative to a position of the mobile terminal apparatus;
    the document capturing device calculating correction information to correct, by relative movement, the three-dimensional position of the document relative to the position of the mobile terminal apparatus;
    the document capturing device deriving first guidance information from the correction information;
    the document capturing device providing the first guidance information to a user of the mobile terminal apparatus, prompting the user to perform the relative movement such that the three-dimensional position of the document is correct relative to the position of the mobile terminal apparatus; and
    the document capturing device capturing the document.

2. The method of claim 1, wherein the step of determining angles between edges comprises, for each two edges detected:
    determining whether the two edges have an intersection; and
    if the two edges have an intersection, determining an angle between the two edges.

3. The method of claim 1, further comprising:
    calculating, based on the correction information, an amount of the relative movement needed to correct the three-dimensional position of the document relative to the position of the mobile terminal apparatus;
    deriving second guidance information including the first guidance information and the amount of the relative movement needed to correct the three-dimensional position of the document relative to the position of the mobile terminal apparatus; and
    providing the second guidance information to the user of the mobile terminal apparatus, prompting the user to perform the amount of the relative movement.

4. The method of claim 3, wherein the step of capturing is performed automatically if the amount of the relative movement is equal to or lower than a predetermined movement threshold.

5. The method of claim 3, wherein the second guidance information includes at least one of visual information, audible information, tactile information, or combinations thereof.

6. The method of claim 1, wherein the step of capturing further comprises at least one of:
    determining an image quality value of the document before capture;
    performing at least one image enhancement operation if the image quality value is equal to or lower than a predetermined image quality threshold; or
    performing Optical Character Recognition of the document after capture.

7. The method of claim 1, wherein the first guidance information includes at least one of visual information, audible information, tactile information, or combinations thereof.

8. A apparatus, comprising:
    an optical device for obtaining a two-dimensional image of the document;
    an edge detector for performing edge detection within the two-dimensional image to identify edges of the document;
    an angle detector for determining angles between detected edges;
    a three-dimensional position calculator for calculating, based on the detected edges and the angles determined, a three-dimensional position of the document relative to a position of the apparatus;
    a three-dimensional position correction calculator for calculating correction information to correct, by relative movement, the three-dimensional position of the document relative to the position of the apparatus;
    a guidance feedback processor for deriving first guidance information from the correction information, wherein the first guidance information is provided to a user of the apparatus, prompting the user to perform the relative movement such that the three-dimensional position of the document is correct relative to the position of the apparatus; and
    a document capture processor for capturing the document.

9. The apparatus of claim 8, wherein the angle detector is adapted to, for each two edges detected, determine whether the two edges have an intersection, and if the two edges have an intersection, determine an angle between the two edges.

10. The apparatus of claim 8, further comprising:
    a relative document movement calculator for calculating, based on the correction information, an amount of the relative movement needed to correct the three-dimensional position of the document relative to the position of the apparatus; and
    an apparatus feedback processor for deriving second guidance information including the first guidance information and the amount of the relative movement needed to correct the three-dimensional position of the document relative to the position of the apparatus, wherein the second guidance information is provided to the user of the apparatus, prompting the user to perform the amount of the relative movement.

11. The apparatus of claim 10, wherein the document capture processor is further adapted to automatically capture the document if the amount of the relative movement is equal to or lower than a predetermined movement threshold.

12. The apparatus of claim 10, wherein the second guidance information includes at least one of visual information, audible information, tactile information, or combinations thereof.

13. The apparatus of claim 8, further comprising at least one of:
- a quality value detector for determining an image quality value of the document before capture;
- an image enhancement processor for performing at least one image enhancement operation if the image quality value is equal to or lower than a predetermined image quality threshold; or
- an optical character recognition processor for performing Optical Character Recognition of the document after capture.

14. The apparatus of claim 8, wherein the first guidance information includes at least one of visual information, audible information, tactile information, or combinations thereof.

15. A computer program product comprising at least one non-transitory computer-readable storage medium including instructions translatable by at least one processor of an apparatus to perform:
- obtaining a two-dimensional image of the document;
- identifying edges of the document within the two-dimensional image;
- determining angles between detected edges;
- calculating, based on the detected edges and the angles determined, a three-dimensional position of the document relative to a position of the apparatus;
- calculating correction information to correct, by relative movement, the three-dimensional position of the document relative to the position of the apparatus;
- deriving first guidance information from the correction information;
- providing the first guidance information to a user of the apparatus, prompting the user to perform the relative movement such that the three-dimensional position of the document is correct relative to the position of the apparatus; and
- capturing the document.

16. The computer program product of claim 15, wherein the instructions are further translatable by the at least one processor to perform, for each two edges detected:
- determining whether the two edges have an intersection; and
- if the two edges have an intersection, determining an angle between the two edges.

17. The computer program product of claim 15, wherein the instructions are further translatable by the at least one processor to perform:
- calculating, based on the correction information, an amount of the relative movement needed to correct the three-dimensional position of the document relative to the position of the apparatus;
- deriving second guidance information including the first guidance information and the amount of the relative movement needed to correct the three-dimensional position of the document relative to the position of the apparatus; and
- providing the second guidance information to the user of the apparatus, prompting the user to perform the amount of the relative movement.

18. The computer program product of claim 17, wherein the capturing is performed automatically if the amount of the relative movement is equal to or lower than a predetermined movement threshold.

19. The computer program product of claim 17, wherein the second guidance information includes at least one of visual information, audible information, tactile information, or combinations thereof.

20. The computer program product of claim 17, wherein the instructions are further translatable by the at least one processor to perform at least one of:
- determining an image quality value of the document before capture;
- performing at least one image enhancement operation if the image quality value is equal to or lower than a predetermined image quality threshold; or
- performing Optical Character Recognition of the document after capture.

21. The computer program product of claim 15, wherein the first guidance information includes at least one of visual information, audible information, tactile information, or combinations thereof.

* * * * *